United States Patent [19]

Coldren et al.

[11] Patent Number: 5,523,540
[45] Date of Patent: Jun. 4, 1996

[54] WELDING ELECTRODES FOR PRODUCING LOW CARBON BAINITIC FERRITE WELD DEPOSITS

[75] Inventors: A. Phillip Coldren, Chesterton, Ind.; Susan R. Fiore; Ronald B. Smith, both of Hanover, Pa.

[73] Assignee: Alloy Rods Global, Inc., Hanover, Pa.

[21] Appl. No.: 140,701

[22] Filed: Oct. 21, 1993

Related U.S. Application Data

[63] Continuation of Ser. No. 889,687, May 27, 1992.

[51] Int. Cl.$^6$ .................................................. B23K 35/22
[52] U.S. Cl. ........................... 219/137 WM; 219/146.23
[58] Field of Search ...................... 219/146.23, 137 WM

[56] References Cited

U.S. PATENT DOCUMENTS

| Re. 28,523 | 8/1975 | Hill et al. |  |
|---|---|---|---|
| 2,532,117 | 11/1950 | Newell et al. |  |
| 2,810,818 | 10/1957 | Rothschild. |  |
| 3,097,294 | 7/1963 | Kubli et al. | 219/146.23 |
| 3,162,751 | 12/1964 | Robins | 219/146.23 |
| 3,172,751 | 3/1965 | Datin. |  |
| 3,195,230 | 7/1965 | Peck et al. |  |
| 3,210,213 | 10/1965 | Cotter et al. |  |
| 3,368,887 | 2/1968 | Clark et al. | 219/146.23 |
| 3,581,054 | 5/1971 | Bjorkroth. |  |
| 3,740,525 | 6/1973 | Baumel | 219/146.23 |
| 3,770,427 | 11/1973 | Petersen | 219/146.23 |
| 3,915,697 | 10/1975 | Giuliani et al. |  |
| 3,994,754 | 11/1976 | Geymond. |  |
| 4,136,814 | 1/1979 | Sarracino et al. |  |
| 4,292,492 | 9/1981 | Duren. |  |
| 4,517,441 | 5/1985 | Kaljee et al. | 219/146.23 |

FOREIGN PATENT DOCUMENTS

| 54-21935 | 2/1979 | Japan. |
| 914339 | 1/1963 | United Kingdom. |
| 1098834 | 1/1968 | United Kingdom. |

OTHER PUBLICATIONS

Pickering, "The Structure & Properties of Bainite in Steels", *Proc. of Symposium on Transformation & Hardenability in Steels*, Climax Molybdenum Co. & The University of Michigan; 1967, pp. 109–129.

W. Steven and A. G. Haynes, "The Temperature of Formation of Martensite and Bainite in Low–Alloy Steels", Journal of the Iron and Steel Institute (Aug. 1956), p. 349.

English translation of Japan Ref. No. 54–21935.

*Primary Examiner*—Clifford C. Shaw
*Attorney, Agent, or Firm*—Kirkpatrick & Lockhart

[57] ABSTRACT

Welding electrodes useful for gas metal-arc welding of low carbon steels such as HSLA and HY steels are provided. Those welding electrodes have a carbon content of up to about 0.05 weight percent, and form weld deposits with a low carbon bainitic ferrite microstructure and yield strength in excess of 80 ksi. More particularly, the welding electrodes have the following elemental composition ranges: 0.01 to 0.05 wt. % carbon, 0.7 to 1.8 wt. % manganese, 0.2 to 0.4 wt. % silicon, 1.0 to 9.0 wt. % nickel, up to 0.8 wt. % chromium, 0.4 to 1.5 wt. % molybdenum, up to 1.0 wt. % copper, up to 0.03 wt. % titanium, and up to 0.035 wt. % aluminum. The weld deposits resulting from those welding electrodes resist hydrogen induced cracking and may be used for welding naval hull materials without substantial preheating.

38 Claims, 1 Drawing Sheet

WELDING ELECTRODES FOR PRODUCING LOW CARBON BAINITIC FERRITE WELD DEPOSITS

This is a continuation of copending application Ser. No. 07/889,687, filed on May 27, 1992.

FIELD OF THE INVENTION

The invention relates to a family of welding electrodes used for gas metal-arc welding. More particularly, the invention relates to welding electrodes which have a carbon content less than about 0.05 weight percent. Weld deposits formed by the welding electrodes of the present invention exhibit a low carbon bainitic ferrite (LCBF) microstructure and have yield strengths between about 80 to 150 ksi. The welding electrodes of the present invention are useful for high heat input welding of high-strength, low-alloy steels without the need for preheating.

DESCRIPTION OF THE INVENTION BACKGROUND

Shipyard welding typically involves high-strength low-alloy (HSLA) steels which are welded with high heat input. HSLA steels are characterized by low carbon contents which are generally less than 0.06 weight percent. The low-carbon high-strength nature of HSLA steels necessitates welding electrodes which form weld deposits with particular characteristics.

For example, conventional welding electrodes for HSLA steels generally have compositions as listed below in TABLE 1.

TABLE 1

CONVENTIONAL WELDING ELECTRODE COMPOSITIONS FOR WELDING OF LOW ALLOY STEELS

| elemental composition | AWS A5.28 80S-D2 | MIL-E-23765/2D 100S-1 | MIL-E-24355B 140S-1 |
|---|---|---|---|
| carbon | 0.07 to 0.12 | up to 0.08 | up to 0.12 |
| manganese | 1.60 to 2.10 | 1.25 to 1.80 | 1.50 to 2.00 |
| silicon | 0.50 to 0.80 | 0.20 to 0.55 | 0.30 to 0.50 |
| nickel | up to 0.15 | 1.40 to 2.10 | 1.95 to 3.10 |
| chromium | not specified | up to 0.30 | 0.65 to 1.05 |
| molybdenum | 0.40 to 0.60 | 0.25 to 0.55 | 0.40 to 1.00 |
| copper | up to 0.50 | up to 0.30 | up to 0.15 |
| titanium | not specified | up to 0.10 | up to 0.04 |
| aluminum | not specified | up to 0.10 | up to 0.04 |

(Compositions shown in TABLE 1 and elsewhere in this application, unless otherwise noted, refer to the weight percent of that element in the total electrode weight.)

In particular, TABLE 1 shows the composition ranges for three different welding electrodes used to weld high-strength, low-alloy steels. Those three welding electrodes correspond to three industry specifications: (1) American Welding Society (AWS) specification AWS A5.28, classification 80S-D2 for gas-shielded, metal-arc, low-alloy steel welding electrodes; (2) Military Specification MIL-E-23765-2D, classification 100S-1 for naval hull materials; and (3) Military Specification MIL-E-24355B, classification 140S-1 for naval hull materials.

Typically, welding electrodes with carbon contents greater than about 0.06 weight percent are specified for welding HSLA steels to promote the strength of the weld deposit. It has been found that the microstructure of weld deposits from conventional welding electrodes used for HSLA steels rely on martensite formation in order to achieve the required higher strength levels, and the strength of martensite is dependent on its carbon content. Higher carbon contents result in higher strength levels.

Moreover, the percentage of martensite formed, and thus the weld metal strength level is very dependent upon the weld metal cooling rate. Faster cooling rates promote martensite formation. Consequently weld metal cooling rates must be carefully controlled so that the amount of martensite formed is fairly constant, because variations in the amount of martensite will result in variations in the strength of the weld metal. For example, TABLE 2 shows the effect of heat input and cooling rate on the yield strength of conventional welding electrodes for welding HY-100 and HSLA-100 steels

TABLE 2

Effect of Heat Input/Cooling Rate on Yield Strength for Conventional Welding Electrodes

| Electrode Type | Transfer Mode | Heat Input (KJ/in) | Cooling Rate (°F./sec) | Yield Strength (ksi) |
|---|---|---|---|---|
| 120S-1 | GMAW-Pulsed | 30.1 | 58.3 | 128.0 |
| 120S-1 | GMAW-Pulsed | 78.7 | 6.4 | 95.0 |
| 120S-1 | GMAW-Spray | 30.3 | 75.4 | 132.0 |
| 120S-1 | GMAW-Spray | 79.7 | 5.8 | 98.5 |

It should be appreciated, however, that the need to carefully control the weld metal cooling rate limits the useability of an electrode because it restricts the useful range of controllable parameters that affect the cooling rate—most particularly, welding heat input, interpass temperature and plate thickness.

In addition, the higher strength level of martensitic microstructures for conventional martensite-forming welding electrodes is offset by their greater sensitivity to hydrogen induced cracking and stress corrosion cracking. In order to minimize this tendency, the welding preheat and interpass temperatures must be maintained at sufficiently high levels so as to allow the hydrogen to diffuse out of the weld area. This precaution reduces the likelihood of hydrogen induced cracking.

Thus, a need exists for a family of welding electrodes which form weld deposits with the same strength as the martensitic microstructure weld deposits formed by conventional high-strength steel welding electrodes but which do not suffer from the disadvantages associated with those weld deposits.

SUMMARY OF THE INVENTION

The present invention provides a family of welding electrodes and a method of using those welding electrodes for gas metal-arc welding. In particular, the welding electrodes of the present invention have a carbon content of up to about 0.05 weight percent. Moreover, the welding electrodes of the present invention form weld deposits with a low carbon bainitic ferrite microstructure and have yield strengths ranging from about 80 ksi to about 150 ksi.

More particularly, the welding electrodes of the present invention have the following elemental composition ranges:

about 0.01 to 0.05 wt. % carbon;

about 0.7 to 1.8 wt. % manganese;

about 0.2 to 0.4 wt. % silicon;

about 1.0 to 9.0 wt. % nickel;

up to about 0.8 wt. % chromium;
about 0.4 to 1.5 wt. % molybdenum;
up to about 1.0 wt. % copper;
up to about 0.03 wt. % titanium; and
up to about 0.035 wt. % aluminum.

Preferably, the welding electrodes have the following elemental composition ranges:

about 0.03 wt. % carbon;
about 0.70 to 1.65 wt. % manganese;
about 0.20 to 0.35 wt. % silicon;
about 2.0 to 6.0 wt. % nickel;
up to about 0.4 wt. % chromium;
about 0.4 to 1.2 wt. % molybdenum;
up to about 0.8 wt. % copper;
up to about 0.03 wt. % titanium; and
up to about 0.035 wt. % aluminum.

These welding electrodes are particularly useful for gas metal-arc welding of HSLA steels and HY steels to form weld deposits that generally satisfy the military specifications for naval hull materials. In addition, these welding electrodes are useful for high heat input welding.

The welding electrodes of the present invention overcome the disadvantages associated with conventional welding electrodes for welding high-strength steels by forming a different type of microstructure without sacrificing strength. More particularly, the welding electrodes of the present invention form weld deposits with a low carbon bainitic ferrite (LCBF) microstructure which has traditionally been considered too weak for welding high-strength steels. Nevertheless, the welding electrodes of the present invention form weld deposits of sufficient strength (80 to 150 ksi) for welding high-strength steels by including other selected ingredients which maximize the strength of the LCBF microstructure.

An additional advantage of the welding electrodes of the present invention is their ability to produce sufficient strength over a wide range of welding conditions. For example, the heat input and cooling rate of the welding procedure may be varied without adverse effects on the weld deposit strength. Further, the welding electrodes of the present invention do not require preheating to drive off hydrogen, or careful cooling to maximize the formation of a martensite microstructure. Moreover, the LCBF microstructure of the weld deposits are less susceptible to hydrogen induced cracking or stress corrosion cracking than are conventional weld deposits with a martensitic microstructure.

DETAILED DESCRIPTION OF THE INVENTION

The present invention provides a family of welding electrodes which are useful for gas metal-arc welding of HSLA steels, and form weld deposits with a LCBF microstructure that exhibit yield strengths ranging from about 80 to 150 ksi ("ksi"=1000 pounds of force per square inch). Moreover, the welding electrodes of the present invention provide these yield strengths over a wide range of welding conditions.

The welding electrodes of the present invention have specific elemental composition ranges for promoting high-strength weld deposits with a LCBF microstructure. In particular, the welding electrodes have a carbon content ranging from about 0.01 to 0.05 weight percent. Preferably, the carbon content is about 0.03 weight percent. This carbon content promotes the formation of a LCBF microstructure in the weld deposits.

The specific ranges of elemental compositions for the welding electrodes of the present invention are described below in TABLE 3:

TABLE 3

Elemental Compositions for the Welding Electrodes of the Present Invention

| Elemental Composition | wt. % | preferred wt. % |
| --- | --- | --- |
| Carbon (C) | 0.01–0.05 | 0.02–0.04 |
| Manganese (Mn) | 0.70–1.80 | 0.70–1.65 |
| Silicon (Si) | 0.20–0.40 | 0.20–0.35 |
| Nickel (Ni) | 1.00–9.00 | 2.00–6.00 |
| Chromium (Cr) | up to 0.80 | up to 0.40 |
| Molybdenum (Mo) | 0.40–1.50 | 0.40–1.20 |
| Copper (Cu) | up to 1.0 | up to 0.80 |
| Titanium (Ti) | up to 0.030 | up to 0.030 |
| Aluminum (Al) | up to 0.035 | up to 0.035 |

The first column represents ranges of elemental compositions which will achieve the desired performance characteristics for weld deposits formed by the welding electrodes of the present invention. The second column, designated "preferred," represents ranges of elemental compositions which provide optimum performance characteristics for weld deposits formed by the welding electrodes of the present invention.

It should be appreciated that the strength of a weld deposit is predominantly determined by the microstructure of the weld deposit. Furthermore, the microstructure of the weld deposit is determined by the composition of the welding electrode and the welding procedures used for forming the weld deposit.

Figure 1:
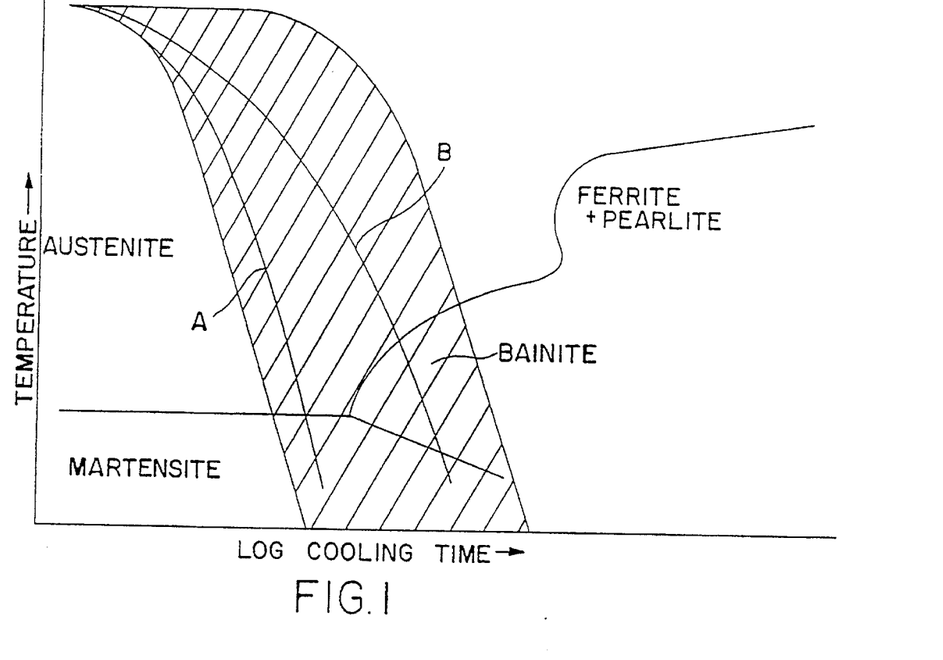
FIG. 1 schematically depicts a continuous cooling transformation (CCT) diagram for a weld deposit microstructure from conventional welding electrodes.

Referring to FIG. 1, a continuous cooling transformation (CCT) diagram shows the microstructure phase transformations for weld deposits formed by conventional welding electrodes for HSLA steels with carbon contents above about 0.06 weight percent. In general, a CCT diagram shows the microstructure phase transformations of a weld deposit as a function of the temperature and the log cooling time for any given cooling path.

The shaded portion of FIG. 1 illustrates the conventional range of cooling curves which can be used for forming weld deposits from conventional welding electrodes, For example, cooling curve A illustrates a fast cooling rate in which the weld deposit microstructure transforms from austenite to martensite. In contrast, cooling curve B illustrates a slower cooling rate in which the weld deposit microstructure transforms from austenite to a mixture of bainite and martensite. In sum, FIG. 1 shows that in order to maximize the martensite microstructure in welds made from conventional welding electrodes for HSLA steels, it is necessary to provide a relatively fast cooling rate to insure that the microstructure transforms directly and completely from austenite to martensite.

Figure 2:
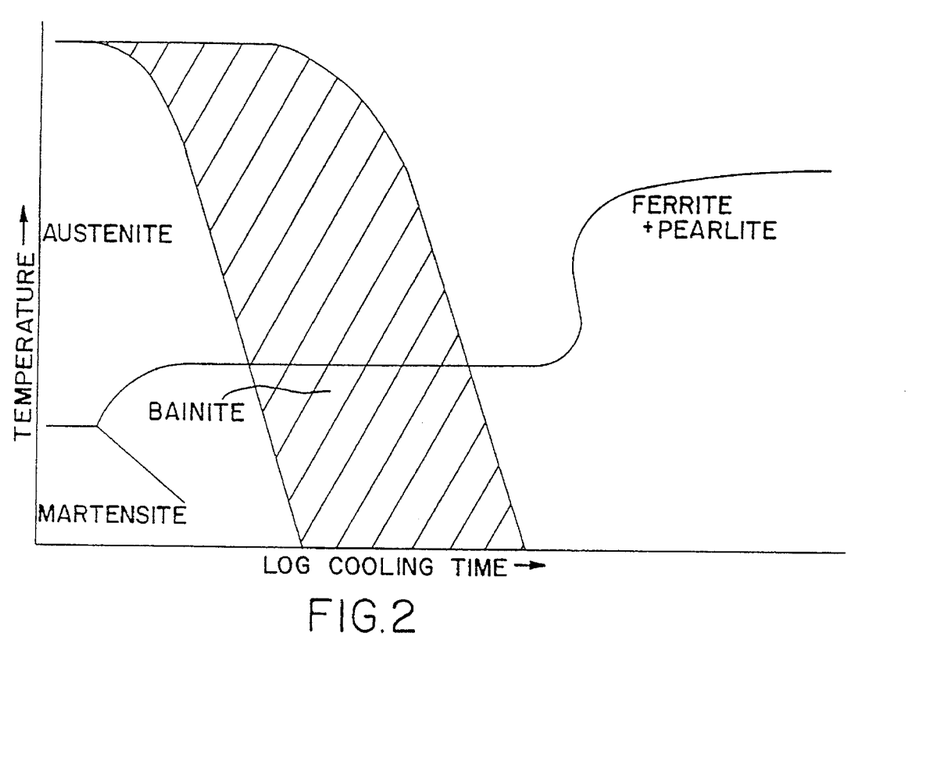
FIG. 2 schematically depicts a continuous cooling transformation (CCT) diagram for a weld deposit microstructure from welding electrodes of the present invention.

Referring to FIG. 2, a CCT diagram shows a typical microstructure phase transformation for weld deposits formed from the welding electrodes of the present invention. That diagram illustrates that the microstructure phase transformations are modified as a result of the compositional differences between the welding electrodes of the present invention and conventional welding electrodes for HSLA steels. In particular, the shaded portion of FIG. 2 shows the range of conventional cooling curves which can be used for weld deposits formed by the welding electrodes of the present invention. Moreover, the entire range of conventional cooling curves when applied to weld deposits formed by the welding electrodes of the present invention result in the transformation of the weld deposit microstructure from austenite into bainite without the formation of martensite.

Thus, FIG. 2 shows that the weld deposit microstructure produced by the welding electrodes of the present invention will achieve the desired LCBF microstructure over a wide range of cooling rates. This is a significant advantage over conventional welding electrodes due to the careful control of the welding procedures required for conventional welding electrodes. For example, the cooling rate for welds from conventional welding electrodes for HSLA steels suffer from competing microstructures (i.e., martensite versus bainite), and must be carefully controlled to achieve acceptable strength. Likewise, the heat input for welding with conventional welding electrodes must be carefully controlled to achieve acceptable strength.

In addition, according to conventional HSLA welding electrode technology, the compositions of the welding electrodes of the present invention are undesirable, because it is virtually impossible to produce a weld deposit with a martensite microstructure from the welding electrodes of the present invention. Instead, the welding electrodes of the present invention produce weld deposits with a LCBF microstructure.

It should be appreciated that the strength of an LCBF microstructure correlates directly with the bainite transformation temperature. The use of lower amounts of carbon along with moderately higher concentrations of nickel and molybdenum results in the extended bainite range shown in FIG. 2. This insures that a wide range of cooling rates will achieve the desired LCBF microstructure.

Some of the noncarbon ingredients in the welding electrode are added to increase the strength of the weld deposit. For example, the strength of the LCBF microstructure in weld deposits formed from the welding electrodes of the present invention is increased by the addition of manganese, chromium, nickel, and molybdenum.

Generally, the welding electrodes of the present invention are used for gas metal-arc welding (also referred to as metal-inert-gas (MIG) welding). In particular, the welding electrodes are particularly useful in high heat input welding on naval ships which use HSLA steels. In addition, the welding electrodes of the present invention are useful for welding HY (high yield strength) steels which have slightly higher carbon contents.

Moreover, the welding electrodes of the present invention were designed to satisfy military specifications for welding of naval hull materials—i.e., HY-80, HSLA-80, HY-100, HSLA-100, HY-130, and HSLA-130. In particular, a primary performance characteristic for the welding electrodes described in the military specifications is a yield strength ranging from about 80 to 150 ksi. The yield strength (YS) of a material is the measure of the amount of force necessary to cause the material to begin to deform. The welding electrodes of the present invention satisfy the yield strength requirements for naval hull materials.

A more thorough understanding of the present invention can be obtained by referring to the following examples of welding electrodes prepared according to the present invention. These examples are, of course, illustrative of the invention and not intended to unduly restrict the invention as described in the claims provided herein.

EXAMPLES

Multiple examples of welding electrodes according to the present invention were prepared. The amounts of the various ingredients in the welding electrodes were varied to explore the effect of compositional changes on the performance of weld deposits formed from those welding electrodes. In addition, the heat input used for forming weld deposits from those welding electrodes was varied.

The compositions of those welding electrodes and the corresponding compositions and mechanical properties for the resulting weld deposits are reported below in TABLES 4A, 4B and 4C. It should be noted that some examples represent multiple runs of the same welding electrode composition but with different heat inputs or other welding procedure parameters. For example, Example Nos. 2, 33 and 34 all represent the example welding electrode composition identified by Sample Id. V378A. All welding in the examples was performed on HY-100 plate.

In particular, TABLE 4A reports the elemental composition for the multiple examples of welding electrodes according to the present invention. That table does not list all ingredients but only those ingredients that were believed to have substantial effects on the performance of the weld deposit. The ranges of the elemental compositions for the examples in TABLES 4A, 4B and 4C of the welding electrodes of the present invention are shown below in TABLE 5.

TABLE 5

Elemental Composition Ranges for the Examples of Welding Electrodes According to the Present Invention

| element | low | high |
| --- | --- | --- |
| carbon | 0.012 | 0.035 |
| manganese | 0.89 | 1.69 |
| nickel | 2.46 | 5.92 |
| chromium | 0.014 | 0.52 |
| molybdenum | 0.44 | 0.96 |
| titanium | 0.018 | 0.045 |
| aluminum | 0.001 | 0.038 |

The amount of silicon (Si) was maintained at about 0.3 wt. %, the amount of phosphorous (P) was maintained at about 0.010 wt. %, and the amount of zirconium (Zr) was maintained at levels less than 0.003 wt. %. The amount of sulfur (S) was maintained at levels of about 0.005 wt. % except for Example Nos. 15 and 28 in which the amount was doubled to 0.012 wt. %. No vanadium was added in the compositions of the welding electrodes.

In TABLES 4A, 4B, and 4C, the designation "V" in the Sample Id. indicates that the electrode is a solid wire while in TABLE 4A, 4B, 4C the designation "WO" in the Sample Id. indicates that the electrode is metal cored.

TABLE 4B reports the elemental composition for the weld deposits formed from the multiple examples of welding electrodes according to the present invention. Essentially, this information, in conjunction with TABLE 4A, provides a correlation between the composition of the welding electrode and the resulting weld deposit.

TABLE 4C reports the heat input and cooling rate (CR) used to form the weld deposits for the various examples of the welding electrodes of the present invention and the mechanical properties of those weld deposits. The cooling rates were varied by changing the heat input, plate thickness, preheat temperature, and interpass temperature. In particular, the mechanical properties reported are the yield strength (YS), ultimate tensile strength (UTS), percent elongation (%EL), percent reduction of area (%RA), and the impact toughness (CVN) at 0° F. and −60° F. TABLE 4C shows that the examples of the welding electrodes of the present invention formed weld deposits with yield strengths ranging from 88 to 138 ksi.

In contrast to conventional welding electrodes as shown in TABLE 2, TABLE 6 below shows that the welding electrodes of the present invention are relatively insensitive to welding procedures for welding electrodes with low carbon content contrary to the conventional expectation for low carbon electrodes.

TABLE 6

Effects of Welding Procedure on Weld Deposits Formed by the Welding Electrodes of the Present Invention

| Example Nos. | HI Range | CR Range | YS Range | UTS Range | Wire Carbon |
|---|---|---|---|---|---|
| 2, 33, 34 | 34–83 | 6–64 | 110–122 | 128–133 | 0.016 |
| 4, 7, 32 | 34–112 | 6–64 | 89–99 | 102–107 | 0.012 |
| 10, 24 | 53–112 | 6–34 | 108–122 | 124–132 | 0.023 |
| 17, 25 | 53–112 | 6–34 | 106–127 | 126–132 | 0.029 |
| 19, 29 | 55–112 | 6–31 | 98–120 | 120–127 | 0.028 |
| 15, 28 | 53–112 | 6–34 | 101–124 | 124–133 | 0.035 |
| 23, 27 | 53–112 | 6–34 | 104–127 | 124–136 | 0.027 |
| 35, 36 | 30–70 | 7–61 | 115–120 | 120–128 | 0.029* |
| 39, 40 | 30–70 | 7–61 | 114–115 | 121–124 | 0.028* |

*average deposit carbon

In addition, TABLE 4C indicates the effects on the weld deposit properties due to changes in the elemental composition. In particular, the strength and toughness of the weld deposits increased with the amount of manganese and nickel in the composition. For example, Example Nos. 3 versus 11 and 6 versus 1 show that the YS and UTS increased when the nickel content was increased from about 2 wt. % to about 6 wt. %. Likewise, the toughness (CVN at −60° F.) increased with the nickel content. More particularly, nickel contents of about 5 wt. % appear to provide the optimum strength and toughness. Manganese contents between 1 and 2 wt. % also appear to optimize the strength and toughness of the weld deposit.

Other components such as aluminum and silicon appear to decrease the toughness of the weld deposits. For example, Example Nos. 4 and 7 show that the toughness (CVN) increased with decreasing aluminum content. Preferably, the silicon content should be maintained between about 0.2 to 0.35 wt. %. A minimum amount of silicon is required for weldability to promote bead wetting and porosity avoidance, but too much deteriorates toughness. The aluminum content should be maintained as close to zero as possible. The strength and toughness of the weld deposit appears to be maximized when titanium is deliberately added in amounts between about 0,010 to 0,045 wt. %.

The detailed description and examples are provided to explain the welding electrodes of the present invention and their corresponding advantages. It should be appreciated that variations and changes could be made to the welding electrodes described above without departing from the spirit and scope of the invention as claimed.

TABLE 4A

Elemental Compositions for Examples of the Welding Electrodes of the Present Invention

| Example No. | Sample Id. | C | Mn | Si | S | P | Ni | Cr | Mo | V | Al | Ti | Zr |
|---|---|---|---|---|---|---|---|---|---|---|---|---|---|
| 1 | V368A | 0.027 | 0.93 | 0.27 | 0.003 | 0.011 | 5.49 | 0.31 | 0.96 | <0.01 | 0.038 | 0.027 | <0.01 |
| 2 | V378A | 0.016 | 1.04 | 0.27 | 0.004 | 0.012 | 5.67 | 0.52 | 0.68 | <0.01 | 0.020 | 0.024 | <0.01 |
| 3 | V568-1A | 0.034 | 0.92 | 0.34 | 0.003 | 0.008 | 2.46 | 0.33 | 0.92 | 0.005 | 0.017 | 0.019 | 0.002 |
| 4 | V569-2A | 0.012 | 1.66 | 0.33 | 0.004 | 0.009 | 2.67 | 0.014 | 0.48 | 0.005 | 0.008 | 0.018 | 0.002 |
| 5 | V568A-1A | 0.032 | 0.90 | 0.36 | 0.004 | 0.010 | 2.51 | 0.35 | 0.92 | 0.006 | 0.037 | 0.024 | 0.002 |
| 6 | V568A-1B | 0.031 | 0.89 | 0.36 | 0.004 | 0.010 | 3.41 | 0.35 | 0.91 | 0.006 | 0.031 | 0.023 | 0.002 |
| 7 | V569A-2A | 0.021 | 1.69 | 0.35 | 0.004 | 0.009 | 2.68 | 0.01 | 0.48 | 0.005 | 0.035 | 0.022 | 0.002 |
| 8 | V569A-2B | 0.016 | 1.65 | 0.35 | 0.004 | 0.010 | 2.72 | 0.23 | 0.48 | 0.005 | 0.027 | 0.023 | 0.003 |
| 9 | V569-2A | 0.012 | 1.66 | 0.33 | 0.004 | 0.009 | 2.67 | 0.01 | 0.48 | 0.005 | 0.008 | 0.018 | 0.002 |
| 10 | V740-1A | 0.023 | 0.94 | 0.33 | 0.006 | 0.009 | 5.92 | 0.30 | 0.86 | 0.005 | 0.001 | 0.019 | 0.002 |
| 11 | V740-1B | 0.024 | 0.95 | 0.34 | 0.006 | 0.009 | 5.69 | 0.30 | 0.88 | 0.006 | 0.014 | 0.018 | 0.003 |
| 12 | V741-2A | 0.032 | 1.61 | 0.33 | 0.006 | 0.008 | 4.64 | 0.01 | 0.89 | 0.006 | 0.006 | 0.021 | 0.002 |
| 13 | V741-2B | 0.034 | 1.54 | 0.34 | 0.006 | 0.008 | 4.93 | 0.01 | 0.86 | 0.005 | 0.005 | 0.039 | 0.003 |
| 14 | V742-3A | 0.035 | 1.56 | 0.34 | 0.004 | 0.009 | 3.88 | 0.34 | 0.86 | 0.005 | 0.007 | 0.020 | 0.002 |
| 15 | V742-3B | 0.035 | 1.54 | 0.34 | 0.012 | 0.009 | 3.83 | 0.35 | 0.87 | 0.005 | 0.004 | 0.019 | 0.002 |
| 16 | V743-4A | 0.028 | 1.57 | 0.32 | 0.006 | 0.008 | 4.79 | 0.34 | 0.44 | 0.004 | 0.007 | 0.018 | 0.002 |
| 17 | V743-4B | 0.029 | 1.60 | 0.33 | 0.006 | 0.008 | 4.90 | 0.35 | 0.46 | 0.005 | 0.005 | 0.039 | 0.002 |
| 18 | V744-5A | 0.028 | 1.28 | 0.32 | 0.006 | 0.008 | 5.54 | 0.35 | 0.56 | 0.004 | 0.007 | 0.003 | 0.002 |
| 19 | V744-5B | 0.028 | 1.24 | 0.32 | 0.006 | 0.009 | 5.55 | 0.35 | 0.56 | 0.004 | 0.004 | 0.010 | 0.002 |
| 20 | V745-6A | 0.028 | 1.26 | 0.33 | 0.008 | 0.008 | 5.64 | 0.35 | 0.57 | 0.004 | 0.007 | 0.013 | 0.002 |
| 21 | V745-6B | 0.027 | 1.28 | 0.32 | 0.006 | 0.008 | 5.48 | 0.34 | 0.56 | 0.004 | 0.003 | 0.020 | 0.001 |
| 22 | V746-7A | 0.027 | 1.28 | 0.33 | 0.006 | 0.008 | 5.57 | 0.35 | 0.57 | 0.004 | 0.006 | 0.032 | 0.001 |
| 23 | V746-7B | 0.027 | 1.26 | 0.32 | 0.006 | 0.008 | 5.51 | 0.34 | 0.56 | 0.004 | 0.004 | 0.045 | 0.001 |
| 24 | V740-1A | 0.023 | 0.94 | 0.33 | 0.006 | 0.009 | 5.92 | 0.30 | 0.86 | 0.005 | 0.001 | 0.019 | 0.002 |
| 25 | V743-4B | 0.029 | 1.60 | 0.33 | 0.006 | 0.008 | 4.98 | 0.35 | 0.46 | 0.005 | 0.005 | 0.039 | 0.002 |
| 26 | V745-6A | 0.028 | 1.26 | C.33 | 0.008 | 0.008 | 5.64 | 0.35 | 0.57 | 0.004 | 0.007 | 0.013 | 0.002 |
| 27 | V746-7B | 0.027 | 1.26 | 0.32 | 0.006 | 0.008 | 5.51 | 0.34 | 0.56 | 0.004 | 0.004 | 0.045 | 0.001 |
| 28 | V742-3B | 0.035 | 1.54 | 0.34 | 0.012 | 0.009 | 3.83 | 0.35 | 0.87 | 0.005 | 0.004 | 0.019 | 0.002 |
| 29 | V744-5B | 0.028 | 1.24 | 0.32 | 0.006 | 0.008 | 5.55 | 0.35 | 0.56 | 0.004 | 0.004 | 0.010 | 0.002 |
| 30 | V745-6A | 0.028 | 1.24 | 0.32 | 0.006 | 0.008 | 5.55 | 0.35 | 0.56 | 0.004 | 0.004 | 0.010 | 0.002 |
| 31 | V745-6A | 0.028 | 1.26 | 0.33 | 0.008 | 0.008 | 5.64 | 0.35 | 0.57 | 0.004 | 0.007 | 0.013 | 0.002 |
| 32 | V569-2A | 0.012 | 1.66 | 0.33 | 0.004 | 0.009 | 2.67 | 0.01 | 0.48 | 0.005 | 0.008 | 0.018 | 0.002 |

TABLE 4A-continued

Elemental Compositions for Examples of the Welding Electrodes of the Present Invention

| Example No. | Sample Id. | C | Mn | Si | S | P | Ni | Cr | Mo | V | Al | Ti | Zr |
|---|---|---|---|---|---|---|---|---|---|---|---|---|---|
| 33 | V378A | 0.016 | 1.04 | 0.27 | 0.004 | 0.012 | 5.67 | 0.52 | 0.68 | <0.01 | 0.020 | 0.024 | <0.01 |
| 34 | V378A | 0.016 | 1.04 | 0.27 | 0.004 | 0.012 | 5.67 | 0.52 | 0.68 | <0.01 | 0.020 | 0.024 | <0.01 |
| 35 | WO-390 | 0.020 | 1.00 | 0.35 | — | — | 5.50 | 0.35 | 0.50 | — | — | 0.025 | — |
| 36 | WO-390 | 0.020 | 1.00 | 0.35 | — | — | 5.50 | 0.35 | 0.50 | — | — | 0.025 | — |
| 37 | WO-391 | 0.020 | 1.60 | 0.35 | — | — | 4.85 | — | 0.60 | — | — | 0.025 | — |
| 38 | WO-398 | 0.020 | 1.10 | 0.35 | — | — | 5.30 | 0.25 | 0.50 | — | — | 0.025 | — |
| 39 | WO-399 | 0.020 | 1.60 | 0.35 | — | — | 4.50 | — | 0.60 | — | — | 0.030 | — |
| 40 | WO-400 | 0.020 | 0.90 | 0.35 | — | — | 5.50 | 0.30 | 0.80 | — | — | 0.025 | — |
| 41 | WO-399 | 0.020 | 1.60 | 0.35 | — | — | 4.50 | — | 0.60 | — | — | 0.030 | — |
| 42 | WO-405 | 0.020 | 1.00 | 0.35 | — | — | 3.70 | 0.60 | 0.60 | — | — | 0.015 | — |
| 43 | WO-406 | 0.020 | 1.65 | 0.35 | — | — | 2.70 | — | 0.50 | — | — | 0.015 | — |
| 44 | WO-407 | 0.020 | 1.00 | 0.35 | — | — | 4.50 | 0.35 | 0.60 | — | — | 0.015 | — |
| 45 | WO-408 | 0.020 | 1.25 | 0.35 | — | — | 5.60 | 0.60 | 0.60 | — | — | 0.025 | — |

*Compositional ranges for welding electrodes with a WO designation are shown on an AIM basis.

TABLE 4B

Weld Deposit Compositions for Examples of the Welding Electrodes of the Present Invention

| Example No. | Sample Id. | C | Mn | Si | S | P | Ni | Cr | Mo | V | Al | Ti | Zr |
|---|---|---|---|---|---|---|---|---|---|---|---|---|---|
| 1 | V368A | 0.047 | 0.68 | 0.18 | 0.010 | 0.014 | 5.15 | 0.38 | 0.91 | <0.01 | 0.020 | 0.010 | <0.01 |
| 2 | V378A | 0.029 | 0.73 | 0.21 | 0.013 | 0.015 | 5.12 | 0.65 | 0.63 | <0.01 | 0.010 | 0.010 | <0.01 |
| 3 | V568-1A | 0.049 | 0.67 | 0.26 | 0.010 | 0.008 | 2.48 | 0.46 | 0.87 | <.003 | 0.026 | 0.008 | 0.001 |
| 4 | V569-2A | 0.041 | 1.23 | 0.23 | 0.011 | 0.010 | 2.70 | 0.20 | 0.48 | <.003 | 0.024 | 0.006 | 0.001 |
| 5 | V568A-1A | 0.065 | 0.69 | 0.28 | 0.011 | 0.006 | 3.19 | 0.50 | 0.86 | <.003 | 0.039 | 0.012 | 0.002 |
| 6 | V568A-1B | 0.067 | 0.68 | 0.27 | 0.009 | 0.005 | 3.40 | 0.52 | 0.84 | <.003 | 0.027 | 0.012 | 0.001 |
| 7 | V569A-2A | 0.056 | 1.31 | 0.28 | 0.009 | 0.007 | 2.77 | 0.28 | 0.48 | <.003 | 0.031 | 0.014 | 0.001 |
| 8 | V569A-2B | 0.046 | 1.32 | 0.28 | 0.009 | 0.007 | 2.74 | 0.42 | 0.47 | <.003 | 0.029 | 0.017 | 0.001 |
| 9 | V569-2A | 0.034 | 1.28 | 0.25 | 0.011 | 0.007 | 2.80 | 0.20 | 0.48 | <.001 | <.005 | 0.010 | 0.001 |
| 10 | V740-1A | 0.046 | 0.66 | 0.23 | 0.010 | 0.010 | 5.19 | 0.44 | 0.80 | <.005 | 0.006 | 0.006 | 0.001 |
| 11 | V740-1B | 0.043 | 0.69 | 0.24 | 0.007 | 0.009 | 5.26 | 0.37 | 0.82 | <.005 | 0.009 | 0.007 | 0.001 |
| 12 | V741-2A | 0.054 | 1.23 | 0.23 | 0.006 | 0.009 | 4.35 | 0.11 | 0.82 | <.005 | 0.006 | 0.007 | 0.001 |
| 13 | V741-2B | 0.055 | 1.23 | 0.23 | 0.006 | 0.007 | 4.18 | 0.14 | 0.83 | <.005 | 0.003 | 0.011 | <.001 |
| 14 | V742-3A | 0.047 | 1.15 | 0.22 | 0.003 | 0.007 | 3.28 | 0.54 | 0.77 | <.005 | 0.007 | 0.005 | <.001 |
| 15 | V742-3B | 0.059 | 1.17 | 0.24 | 0.012 | 0.008 | 3.36 | 0.48 | 0.78 | <.005 | 0.005 | 0.006 | 0.001 |
| 16 | V743-4A | 0.045 | 1.23 | 0.22 | 0.009 | 0.010 | 4.25 | 0.48 | 0.47 | <.005 | 0.012 | 0.006 | <.001 |
| 17 | V743-4B | 0.051 | 1.26 | 0.25 | 0.004 | 0.009 | 4.24 | 0.45 | 0.45 | <.005 | 0.003 | 0.015 | 0.001 |
| 18 | V744-5A | 0.046 | 0.98 | 0.23 | 0.009 | 0.009 | 4.78 | 0.43 | 0.56 | <.005 | 0.008 | 0.001 | <.001 |
| 19 | V744-5B | 0.046 | 0.98 | 0.24 | 0.008 | 0.010 | 4.82 | 0.42 | 0.57 | <.005 | 0.010 | 0.004 | 0.001 |
| 20 | V745-6A | 0.045 | 1.01 | 0.24 | 0.008 | 0.008 | 4.84 | 0.43 | 0.57 | <.005 | 0.009 | 0.005 | 0.001 |
| 21 | V745-6B | 0.047 | 0.96 | 0.22 | 0.006 | 0.009 | 4.76 | 0.46 | 0.57 | <.005 | 0.003 | 0.006 | 0.001 |
| 22 | V746-7A | 0.039 | 1.04 | 0.24 | 0.009 | 0.008 | 4.81 | 0.45 | 0.57 | <.005 | 0.005 | 0.010 | 0.001 |
| 23 | V746-7B | 0.055 | 1.03 | 0.25 | 0.011 | 0.008 | 4.75 | 0.44 | 0.56 | <.005 | <.002 | 0.013 | <.002 |
| 24 | V740-1A | 0.044 | 0.70 | 0.23 | 0.009 | 0.010 | 5.17 | 0.33 | 0.85 | — | 0.003 | 0.007 | — |
| 25 | V743-4B | 0.038 | 1.05 | 0.24 | 0.008 | 0.010 | 4.87 | 0.38 | 0.56 | — | 0.006 | 0.015 | — |
| 26 | V745-6A | 0.042 | 1.06 | 0.24 | 0.009 | 0.012 | 4.96 | 0.38 | 0.58 | — | 0.005 | 0.015 | — |
| 27 | V746-7B | 0.047 | 1.07 | 0.25 | 0.009 | 0.012 | 4.92 | 0.35 | 0.60 | — | 0.002 | 0.017 | — |
| 28 | V742-3B | 0.053 | 1.37 | 0.27 | 0.006 | 0.004 | 3.51 | 0.40 | 0.87 | — | 0.013 | 0.011 | — |
| 29 | V744-5B | 0.038 | 1.03 | 0.23 | 0.009 | 0.010 | 4.88 | 0.37 | 0.58 | — | 0.001 | 0.005 | — |
| 30 | V745-6A | 0.033 | 0.97 | 0.22 | 0.011 | 0.009 | 4.84 | 0.38 | 0.58 | 0.003 | 0.003 | 0.002 | — |
| 31 | V745-6A | 0.039 | 0.99 | 0.22 | 0.012 | 0.010 | 4.93 | 0.40 | 0.56 | 0.003 | 0.002 | — | — |
| 32 | V569-2A | 0.029 | 1.32 | 0.23 | 0.010 | 0.010 | 2.77 | 0.04 | 0.48 | 0.003 | <.001 | — | — |
| 33 | V378A | 0.034 | 0.80 | 0.17 | 0,010 | 0.013 | 5.67 | 0.54 | 0.66 | 0.003 | 0.009 | — | — |
| 34 | V378A | 0.034 | 0.77 | 0.17 | 0.008 | 0.011 | 5.28 | 0.61 | 0.62 | 0.004 | 0.009 | — | — |
| 35 | WO-390 | 0.027 | 0.94 | 0.28 | 0.015 | 0.008 | 6.53 | 0.44 | 0.56 | — | 0.008 | 0.013 | — |
| 36 | WO-390 | 0.031 | 0.87 | 0.28 | 0.016 | 0.008 | 6.32 | 0.44 | 0.55 | — | 0.007 | 0.010 | — |
| 37 | WO-391 | 0.027 | 1.25 | 0.21 | 0.016 | 0.009 | 4.97 | 0.13 | 0.60 | — | 0.005 | 0.006 | — |
| 38 | WO-398 | 0.026 | 0.97 | 0.28 | 0.015 | 0.008 | 5.20 | 0.32 | 0.49 | — | 0.008 | 0.011 | — |
| 39 | WO-399 | 0.029 | 1.36 | 0.26 | 0.015 | 0.008 | 3.64 | 0.09 | 0.48 | — | 0.006 | 0.008 | — |
| 40 | WO-400 | 0.023 | 0.88 | 0.32 | 0.014 | 0.008 | 5.79 | 0.37 | 0.82 | — | 0.009 | 0.014 | — |
| 41 | WO-399 | 0.025 | 1.57 | 0.33 | 0.015 | 0.008 | 5.46 | 0.08 | 0.69 | — | 0.010 | 0.013 | — |
| 42 | WO-405 | 0.034 | 1.05 | 0.30 | 0.018 | 0.007 | 3.89 | 0.66 | 0.60 | — | 0.004 | 0.006 | — |
| 43 | WO-406 | 0.061 | 1.48 | 0.28 | 0.014 | 0.007 | 2.75 | 0.11 | 0.48 | — | 0.004 | 0.009 | — |
| 44 | WO-407 | 0.056 | 1.03 | 0.29 | 0.015 | 0.007 | 4.58 | 0.41 | 0.58 | — | 0.006 | 0.012 | — |
| 45 | WO-408 | 0.053 | 1.27 | 0.32 | 0.015 | 0.008 | 5.87 | 0.64 | 0.61 | — | 0.006 | 0.011 | — |

TABLE 4C

Mechanical Properties for Examples of the Welding Electrodes of the Present Invention

| Example No. | Sample Id. | Heat Input (KJ/in) | CR (°F./sec) | YS (ksi) | UTS (ksi) | % EL | % RA | CVN (0° F.) (ft-lbs) | CVN (−60° F.) (ft-lbs) |
|---|---|---|---|---|---|---|---|---|---|
| 1 | V368A | 124.3 | 5.2 | 114.9 | 130.6 | 20 | 59 | 59 | 55 |
| 2 | V378A | 54.0 | 32.8 | 119.5 | 128.0 | 18 | 59 | 57 | 49 |
| 3 | V568-1A | 111.5 | 6.2 | 95.3 | 108.3 | 23 | 67 | 60 | 14 |
| 4 | V569-2A | 111.5 | 6.2 | 88.5 | 101.9 | 25 | 72 | 98 | 64 |
| 5 | V568A-1A | 111.5 | 6.2 | 96.5 | 112.1 | 23 | 65 | 49 | 20 |
| 6 | V568A-1B | 111.5 | 6.2 | 101.9 | 115.4 | 22 | 60 | 54 | 28 |
| 7 | V569A-2A | 111.5 | 6.2 | 95.2 | 108.4 | 25 | 70 | 85 | 42 |
| 8 | V569A-2B | 111.5 | 6.2 | 96.1 | 109.7 | 24 | 65 | 85 | 45 |
| 9 | V569-2A | 55.5 | 31.4 | 98.9 | 106.5 | 23 | 70 | 103 | 60 |
| 10 | V740-1A | 111.5 | 6.2 | 107.5 | 124.1 | 20 | 54 | 71 | 62 |
| 11 | V740-1B | 111.5 | 6.2 | 105.9 | 123.9 | 22.5 | 63 | 59 | 47 |
| 12 | V741-2A | 111.5 | 6.2 | 104.3 | 123.8 | 22 | 63 | 65 | 48 |
| 13 | V741-2B | 111.5 | 6.2 | 102.2 | 126.9 | 22 | 59 | 66 | 54 |
| 14 | V742-3A | 111.5 | 6.2 | 99.2 | 126.4 | 20.5 | 56 | 62 | 36 |
| 15 | V742-3B | 111.5 | 6.2 | 100.7 | 124.4 | 20.5 | 54 | 58 | 40 |
| 16 | V743-4A | 111.5 | 6.2 | 99.3 | 119.3 | 22 | 62 | 77 | 53 |
| 17 | V743-4B | 111.5 | 6.2 | 106.3 | 126.2 | 21 | 52 | 74 | 51 |
| 18 | V744-5A | 111.5 | 6.2 | 101.8 | 120.9 | 22 | 61 | 61 | 59 |
| 19 | V744-5B | 111.5 | 6.2 | 97.8 | 119.7 | 21 | 65 | 76 | 58 |
| 20 | V745-6A | 111.5 | 6.2 | 103.8 | 120.7 | 21.5 | 63 | 65 | 56 |
| 21 | V745-6B | 111.5 | 6.2 | 98.6 | 121.4 | 22 | 63 | 73 | 50 |
| 22 | V746-7A | 111.5 | 6.2 | 97.3 | 121.6 | 20.5 | 58 | 72 | 49 |
| 23 | V746-7B | 111.5 | 6.2 | 103.7 | 124.3 | 23 | 63 | 74 | 53 |
| 24 | V740-1A | 52.5 | 34.4 | 121.5 | 132.3 | 18 | 59 | 63 | 54 |
| 25 | V743-4B | 52.5 | 34.4 | 126.5 | 132.1 | 20 | 65 | 83 | 72 |
| 26 | V745-6A | 52.5 | 34.4 | 123.3 | 130.9 | 18 | 57 | 68 | 57 |
| 27 | V746-7B | 52.5 | 34.4 | 127.3 | 136.2 | 19.5 | 62 | 67 | 59 |
| 28 | V742-3B | 52.5 | 34.4 | 124.2 | 132.6 | 19.5 | 61 | 59 | 46 |
| 29 | V744-5B | 55.0 | 31.9 | 120.2 | 127.4 | 20 | 65 | 68 | 51 |
| 30 | V745-6A | 82.5 | 6.5 | 100.0 | 120.5 | 14 | 30 | 65 | 53 |
| 31 | V745-6A | 82.5 | 6.5 | 101.5 | 122.0 | 19.5 | 58 | 69 | 64 |
| 32 | V569-2A | 33.9 | 64.1 | 96.0 | 104.0 | 21 | 71 | 102 | 54 |
| 33 | V378A | 33.9 | 64.1 | 122.0 | 132.7 | 14 | 38 | 50 | 37 |
| 34 | V378A | 82.5 | 6.5 | 110.0 | 129.0 | 17 | 42 | 61 | 58 |
| 35* | WO-390 | 30.0 | 60.8 | 120.0 | 120.0 | 2 | 7.5 | 26 | 24 |
| 36* | WO-390 | 70.0 | 7.2 | 114.5 | 127.5 | 5 | 10.5 | 39 | 38 |
| 37 | WO-391 | 70.0 | 7.2 | 104.5 | 115.9 | 15 | 27.4 | 59 | 47 |
| 38 | WO-398 | 30.0 | 60.8 | 116.5 | 121.7 | 16 | 47.2 | 51 | 36 |
| 39 | WO-399 | 30.0 | 60.8 | 113.5 | 121.2 | 18 | 54.4 | 54 | 39 |
| 40* | WO-399 | 70.4 | 7.2 | 114.5 | 124.0 | 9 | 22 | 53 | 46 |
| 41 | WO-400 | 30.4 | 59.5 | 118.5 | 128.0 | 11 | 29.8 | 23 | 23 |
| 42 | WO-405 | 31.9 | 54.9 | 128.0 | 138.0 | 12 | 40.1 | 30 | 27 |
| 43 | WO-406 | 31.1 | 57.3 | 133.0 | 141.5 | 14 | 47.3 | 43 | 34 |
| 44* | WO-407 | 32.1 | 54.5 | 137.5 | 149.0 | 10 | 37.5 | 28 | 21 |
| 45 | WO-408 | 40.8 | 48.6 | 136.5 | 152.5 | 11 | 34 | 19 | |

*Hydrogen damage was detected, but this was believed to result from the manufacturing technique used for making the experimental wire cored welding electrodes.

What is claimed is:

1. A welding electrode useful for gas metal-arc welding, said welding electrode comprising carbon in an amount less than 0.05 weight percent of said welding electrode weight and further comprising nickel and molybdenum in proportions effective to produce a weld deposit with a low carbon bainitic ferrite microstructure.

2. The welding electrode recited in claim 1 wherein said weld deposit resists hydrogen induced cracking.

3. The welding electrode recited in claim 1 wherein said carbon amount ranges from about 0.01 to about 0.05 weight percent of said welding electrode weight.

4. The welding electrode recited in claim 1 wherein said carbon amount is about 0.03 weight percent of said welding electrode weight.

5. The welding electrode recited in claim 1 wherein said weld deposit has a yield strength in excess of about 80 ksi.

6. The welding electrode recited in claim 1 wherein said welding electrode comprises the following elemental composition, on a weight percent of said welding electrode weight basis:

about 0.7 to 1.8 manganese;

about 0.2 to 0.4 silicon;

about 1.0 to 9.0 nickel;

up to about 0.8 chromium;

about 0.4 to 1.5 molybdenum;

up to about 1.0 copper;

up to about 0.03 titanium; and up to about 0.035 aluminum.

7. The welding electrode recited in claim 1 wherein said aluminum amount is no more than about 0.035 weight percent of said welding electrode weight.

8. A welding electrode useful for gas metal-arc welding, said welding electrode consisting essentially of the following elemental composition, on a weight percent of said welding electrode weight basis:

about 0.01 to less than 0.05 carbon;

about 0.7 to 1.8 manganese;
about 0.2 to 0.4 silicon;
about 1.0 to 9.0 nickel;
up to about 0.8 chromium;
about 0.4 to 1.5 molybdenum;
up to about 1.0 copper;
up to about 0.03 titanium; and
up to about 0.035 aluminum;
the balance iron and incidental impurities.

9. The welding electrode recited in claim 8 wherein said manganese ranges from about 0.70 to 1.65 weight percent of said welding electrode weight.

10. The welding electrode recited in claim 8 wherein said nickel ranges from about 2.0 to 6.0 weight percent of said welding electrode weight.

11. The welding electrode recited in claim 8 wherein said chromium ranges up to about 0.4 weight percent of said welding electrode weight.

12. The welding electrode recited in claim 8 wherein said molybdenum ranges from about 0.4 to 1.2 weight percent of said welding electrode weight.

13. The welding electrode recited in claim 8 wherein said carbon is about 0.03 weight percent of said welding electrode weight.

14. The welding electrode recited in claim 8 wherein said welding electrode forms a weld deposit having a low carbon bainitic ferrite microstructure.

15. The welding electrode recited in claim 14 wherein said weld deposit has a yield strength in excess of about 80 ksi.

16. The welding electrode recited in claim 15 wherein said weld deposit resists hydrogen induced cracking.

17. A welding electrode useful for gas metal-arc welding of low carbon steels, said welding electrode consisting essentially of the following elemental composition, on a weight percent of said welding electrode weight basis:

about 0.01 to less than 0.05 carbon;
about 0.7 to 1.65 manganese;
about 0.2 to 0.35 silicon;
about 2.0 to 6.0 nickel;
up to about 0.4 chromium;
about 0.4 to 1.2 molybdenum;
up to about 0.8 copper;
up to about 0.03 titanium; and
up to about 0.035 aluminum;
the balance iron and incidental impurities.

18. The welding electrode recited in claim 17 wherein said welding electrode forms a weld deposit having a low carbon bainitic ferrite microstructure with a yield strength in excess of about 80 ksi.

19. A method for forming a weld deposit useful for joining pieces of low carbon steel, said method comprising welding said pieces of steel using a gas metal-arc welding technique with a welding electrode comprising carbon in an amount less than 0.05 weight percent of said welding electrode weight, said welding electrode further comprising nickel and molybdenum in proportions effective to produce a weld deposit having a low carbon bainitic ferrite microstructure and a yield strength in excess of about 80 ksi.

20. The method recited in claim 19 wherein said welding electrode consists essentially of the following elemental composition, on a weight percent of said welding electrode weight basis:

about 0.01 to less than 0.05 carbon;
about 0.7 to 1.8 manganese;
about 0.2 to 0.35 silicon;
about 1.0 to 9.0 nickel;
up to about 0.8 chromium;
about 0.4 to 1.5 molybdenum;
up to about 1.0 copper;
up to about 0.03 titanium; and
up to about 0.035 aluminum;
the balance iron and incidental impurities.

21. The method recited in claim 19 wherein said low carbon steels are HSLA steels.

22. The method recited in claim 19 wherein said low carbon steels are HY steels.

23. The method recited in claim 19 wherein said gas metal-arc welding technique uses a high heat input.

24. The method recited in claim 19 wherein said welding electrode does not require high temperature preheating.

25. The method recited in claim 19 wherein said carbon amount is about 0.01 to 0.05 weight percent of said welding electrode weight.

26. The method recited in claim 19 wherein said gas metal-arc welding technique uses a high heat input.

27. The method recited in claim 19 wherein said welding electrode comprises no more than about 0.035 weight percent of said welding electrode weight.

28. A method for forming a weld deposit useful for joining pieces of low carbon steel, said method comprising welding said pieces of steel using a gas metal-arc welding technique with a welding electrode consisting essentially of the the following elemental composition, on a weight percent of said welding electrode weight basis:

about 0.01 to less than 0.05 carbon;
about 0.7 to 1.8 manganese;
about 0.2 to 0.35 silicon;
about 1.0 to 9.0 nickel;
up to about 0.8 chromium;
about 0.4 to 1.5 molybdenum;
up to about 1.0 copper;
up to about 0.03 titanium; and
up to about 0.035 aluminum;
the balance iron and incidental impurities.

29. The method recited in claim 28 wherein said low carbon steels are HSLA steels.

30. The method recited in claim 28 wherein said low carbon steels are HY steels.

31. The method recited in claim 28 wherein said welding electrode does not require high temperature preheating.

32. The method recited in claim 28 wherein said carbon amount is about 0.03 weight percent of said welding electrode weight. nickel, molybdenum and aluminum in proportions effective to produce a weld deposit having a low carbon bainitic ferrite microstructure and a yield strength in excess of about 80 ksi.

33. A welding electrode useful for gas metal-arc welding, said welding electrode consisting essentially of the following elemental composition, on a weight percent of said welding electrode basis, which is effective to produce a weld deposit having a low carbon bainitic ferrite microstructure:

up to about 0.05 carbon;
about 0.07 to 1.8 manganese;
about 0.2 to 0.4 silicon;
about 1.0 to 9.0 nickel;
up to about 0.8 chromium;

about 0.4 to 1.5 molybdenum;

up to about 1.0 copper;

up to about 0.03 titanium; and the balance iron and incidental impurities.

34. The welding electrode recited in claim 33 consisting essentially of the following elemental composition:

about 0.01 to less than 0.05 carbon;

about 0.07 to 1.65 manganese;

about 0.2 to 0.35 silicon;

about 2.0 to 6.0 nickel;

up to about 0.4 chromium;

about 0.4 to 1.2 molybdenum;

up to about 0.8 copper;

up to about 0.03 titanium; and the balance iron and incidental impurities.

35. A method for forming a weld deposit useful for joining pieces of low carbon steel, said method comprising welding said pieces of steel using a gas metal-arc welding technique with a welding electrode consisting essentially of the following elemental composition, on a weight percent of said welding electrode weight basis, which is effective to produce a weld deposit having a low carbon bainitic ferrite microstructure and a yield strength in excess of about 80 ksi:

less than 0.05 carbon;

about 0.07 to 1.8 manganese;

about 0.2 to 0.4 silicon;

about 1.0 to 9.0 nickel;

up to about 0.8 chromium;

about 0.4 to 1.5 molybdenum;

up to about 1.0 copper;

up to about 0.03 titanium; and the balance iron and incidental impurities.

36. The method recited in claim 35 wherein said welding electrode consists essentially of the following elemental composition, on a weight percent of said welding electrode weight basis:

about 0.01 to less than 0.05 carbon;

about 0.07 to 1.65 manganese;

about 0.2 to 0.35 silicon;

about 2.20 to 6.0 nickel;

up to about 0.4 chromium;

about 0.4 to 1.2 molybdenum;

up to about 0.8 copper;

up to about 0.03 titanium; and the balance iron and incidental impurities.

37. A welding electrode useful for gas metal-arc welding, said welding electrode comprising molybdenum, up to about 0.05 weight percent carbon and greater than 3.75 up to about 9.00 weight percent nickel, said carbon, molybdenum and nickel in proportions effective to produce a weld deposit with a low carbon bainitic ferrite microstructure.

38. The welding electrode recited in claim 37 consisting essentially of the following elemental composition, on a weight percent of said welding electrode basis, which is effective to produce a weld deposit having a low carbon bainitic ferrite microstructure:

up to about 0.05 carbon;

about 0.07 to 1.8 manganese;

about 0.2 to 0.4 silicon;

greater than 3.75 up to about 9.0 nickel;

up to about 0.8 chromium;

about 0.4 to 1.5 molybdenum;

up to about 1.0 copper;

up to about 0.03 titanium; and the balance iron and incidental impurities.

* * * * *

UNITED STATES PATENT AND TRADEMARK OFFICE
CERTIFICATE OF CORRECTION

PATENT NO. : 5,523,540

DATED : June 4, 1996

INVENTOR(S) : A. Philip Coldren, Susan R. Fiore and Ronald B. Smith

It is certified that error appears in the above-identified patent and that said Letters Patent is hereby corrected as shown below:

The title page, showing the illustrative Figure should be deleted to be replaced with the attached title page.

In the drawings, sheets 1 and 2, consisting of Figs. 1 and 2, should be deleted to be replaced with Figs. 1 and 2, as shown on the attached pages.

United States Patent [19]

Coldren et al.

[11] Patent Number: 5,523,540
[45] Date of Patent: Jun. 4, 1996

[54] WELDING ELECTRODES FOR PRODUCING LOW CARBON BAINITIC FERRITE WELD DEPOSITS

[75] Inventors: A. Phillip Coldren, Chesterton, Ind.; Susan R. Fiore; Ronald B. Smith, both of Hanover, Pa.

[73] Assignee: Alloy Rods Global, Inc., Hanover, Pa.

[21] Appl. No.: 140,701

[22] Filed: Oct. 21, 1993

Related U.S. Application Data

[63] Continuation of Ser. No. 889,687, May 27, 1992.

[51] Int. Cl.$^6$ ................................................ B23K 35/22
[52] U.S. Cl. ............................. 219/137 WM; 219/146.23
[58] Field of Search ....................... 219/146.23, 137 WM

[56] References Cited

U.S. PATENT DOCUMENTS

| | | |
|---|---|---|
| Re. 28,523 | 8/1975 | Hill et al. . |
| 2,532,117 | 11/1950 | Newell et al. . |
| 2,810,818 | 10/1957 | Rothschild . |
| 3,097,294 | 7/1963 | Kubli et al. ................... 219/146.23 |
| 3,162,751 | 12/1964 | Robins ........................... 219/146.23 |
| 3,172,751 | 3/1965 | Datin . |
| 3,195,230 | 7/1965 | Peck et al. . |
| 3,210,213 | 10/1965 | Cotter et al. . |
| 3,368,887 | 2/1968 | Clark et al. ................... 219/146.23 |
| 3,581,054 | 5/1971 | Bjorkroth . |
| 3,740,525 | 6/1973 | Baumel .......................... 219/146.23 |
| 3,770,427 | 11/1973 | Petersen ......................... 219/146.23 |
| 3,915,697 | 10/1975 | Giuliani et al. . |
| 3,994,754 | 11/1976 | Geymond . |
| 4,136,814 | 1/1979 | Sarracino et al. . |
| 4,292,492 | 9/1981 | Duren . |
| 4,517,441 | 5/1985 | Kaljee et al. ................... 219/146.23 |

FOREIGN PATENT DOCUMENTS

| | | |
|---|---|---|
| 54-21935 | 2/1979 | Japan . |
| 914339 | 1/1963 | United Kingdom . |
| 1098834 | 1/1968 | United Kingdom . |

OTHER PUBLICATIONS

Pickering, "The Structure & Properties of Bainite in Steels", *Proc. of Symposium on Transformation & Hardenability in Steels*, Climax Molybdenum Co. & The University of Michigan; 1967, pp. 109–129.

W. Steven and A. G. Haynes, "The Temperature of Formation of Martensite and Bainite in Low-Alloy Steels", Journal of the Iron and Steel Institute (Aug. 1956), p. 349.

English translation of Japan Ref. No. 54–21935.

*Primary Examiner*—Clifford C. Shaw
*Attorney, Agent, or Firm*—Kirkpatrick & Lockhart

[57] ABSTRACT

Welding electrodes useful for gas metal-arc welding of low carbon steels such as HSLA and HY steels are provided. Those welding electrodes have a carbon content of up to about 0.05 weight percent, and form weld deposits with a low carbon bainitic ferrite microstructure and yield strength in excess of 80 ksi. More particularly, the welding electrodes have the following elemental composition ranges: 0.01 to 0.05 wt. % carbon, 0.7 to 1.8 wt. % manganese, 0.2 to 0.4 wt. % silicon, 1.0 to 9.0 wt. % nickel, up to 0.8 wt. % chromium, 0.4 to 1.5 wt. % molybdenum, up to 1.0 wt. % copper, up to 0.03 wt. % titanium, and up to 0.035 wt. % aluminum. The weld deposits resulting from those welding electrodes resist hydrogen induced cracking and may be used for welding naval hull materials without substantial preheating.

38 Claims, 1 Drawing Sheet

FIG. 1

FIG.2

UNITED STATES PATENT AND TRADEMARK OFFICE
CERTIFICATE OF CORRECTION

PATENT NO. : 5,523,540

DATED : June 4, 1996

INVENTOR(S) : A. Philip Coldren, Susan R. Fiore and Ronald B. Smith

It is certified that error appears in the above-identified patent and that said Letters Patent is hereby corrected as shown below:

Col. 4, line 52, delete "electrodes," and subsitute therefor --electrodes.--.

Col. 9, Table 4A-continued, Example No. 35 in Sample Id. after "WO-390" add --*--.

Col. 11, line 59, delete "about 0.05" and substitute therefor --less than 0.05--.

Col. 14, line 62, delete "up to about" and substitute therefor --less than--.

Col. 14, line 30, delete "of the" and substitute therefor --of--.

Col. 14, lines 53-56, delete "nickel, molybdenum and aluminum in proportions effective to produce a weld deposit having a low carbon bainitic ferrite microstructure and a yield strength in excess of about 80 ksi.".

Col. 16, line 6, delete "2.20" and substitute therefor --2.0--.

Signed and Sealed this

Eighth Day of July, 1997

*Attest:*

BRUCE LEHMAN

*Attesting Officer*     *Commissioner of Patents and Trademarks*

REEXAMINATION CERTIFICATE (3793rd)

United States Patent [19]
Coldren et al.

[11] B1 5,523,540
[45] Certificate Issued Jun. 22, 1999

[54] WELDING ELECTRONICS FOR PRODUCING LOW CARBON BAINITIC FERRITE WELD DEPOSITS

[75] Inventors: A. Philip Coldren, Chesterton, Ind.; Susan R. Fiore; Ronald B. Smith, both of Hanover, Pa.

[73] Assignee: Alloy Rods Global, Inc., Hanover, Pa.

Reexamination Request:
No. 90/004,977, Apr. 28, 1998

Reexamination Certificate for:
Patent No.: 5,523,540
Issued: Jun. 4, 1996
Appl. No.: 08/140,701
Filed: Oct. 21, 1993

Certificate of Correction issued Jul. 8, 1997.

Related U.S. Application Data

[63] Continuation of application No. 07/889,687, May 27, 1992.
[51] Int. Cl.$^6$ ................................................. B23K 35/22
[52] U.S. Cl. ............................ 219/137 WM; 219/146.23
[58] Field of Search ................................. 219/137 WM, 219/146.23

[56] References Cited

FOREIGN PATENT DOCUMENTS

SU446377 11/1974 Russian Federation.
SU 941111 7/1982 Russian Federation.

OTHER PUBLICATIONS

Kane et al., Corrosion of Microalloy Steel Weldments: Hydrogen Induced Cracking/Sulfide Stress Cracking, Proceedings: International Conference on the Metallurgy, Welding and Qualification of Microalloyed (HSLA) Steel Weldments, American Welding Society, Miami, Fl., pp. 752–779a, Nov. 6–8, 1990.

Wong et al., Arc Welding Consumables for HSLA Steels With Yield Strengths of 80 ksi and Above, Proceedings: International Conference on the Metallurgy, Welding and Qualification of Microalloyed (HSLA) Steel Weldments, American Welding Society, Miami, Fl., pp. 450–489c, Nov. 6–8, 1990.

B. A. Graville, "Hydrogen Cracking Sensitivity of HSLA Steels", distributed Nov. 6–8, 1990.

H. K. D. H. Bhadeshia, "Control of Weld Metal Microstructure and Properties", distributed Nov. 6–8, 1990.

*Primary Examiner*—Clifford C. Shaw

[57] ABSTRACT

Welding electrodes useful for gas metal-arc welding of low carbon steels such as HSLA and HY steels are provided. Those welding electrodes have a carbon content of up to about 0.05 weight percent, and form weld deposits with a low carbon bainitic ferrite microstructure and yield strength in excess of 80 ksi. More particularly, the welding electrodes have the following elemental composition ranges: 0.01 to 0.05 wt. % carbon, 0.7 to 1.8 wt. % manganese, 0.2 to 0.4 wt. % silicon, 1.0 to 9.0 wt. % nickel, up to 0.8 wt. % chromium, 0.4 to 1.5 wt. % molybdenum, up to 1.0 wt. % copper, up to 0.03 wt. % titanium, and up to 0.035 wt. % aluminum. The weld deposits resulting from those welding electrodes resist hydrogen induced cracking and may be used for welding naval hull materials without substantial preheating.

B1 5,523,540

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 25–27 are cancelled.

Claims 1, 6, 8–10, 17, 19, 20, 28, and 33–38 are determined to be patentable as amended.

Claims 2–5, 7, 11–16, 18, 21–24, and 29–32, dependent on an amended claim, are determined to be patentable.

1. A welding electrode useful for gas metal-arc welding, said welding electrode comprising *less than 0.05 weight percent* carbon [in an amount less than 0.05 weight percent of said welding electrode weight], *0 to less than 0.01 weight percent vanadium, and greater than 0.7 weight percent manganese, the welding electrode* [and] further comprising [nickel and] molybdenum *and greater than 2.0 weight percent nickel* in proportions effective to produce a weld deposit with a low carbon bainitic ferrite microstructure.

6. The welding electrode recited in claim 1 wherein said welding electrode comprises the following elemental composition, on a weight percent of said welding electrode weight basis:

[about] *greater than* 0.7 to 1.8 manganese;
about 0.2 to 0.4 silicon;
[about 1.0] *greater than 2.0* to 9.0 nickel;
up to about 0.8 chromium;
about 0.4 to 1.5 molybdenum;
up to about 1.0 copper;
up to about 0.03 titanium;
*0 to less than 0.01 vanadium;* and
up to about 0.035 aluminum.

8. A welding electrode useful for gas metal-arc welding, said welding electrode consisting essentially of the following elemental composition, on a weight percent of said welding electrode weight basis:

about 0.01 to less than 0.05 carbon;
[about] *greater than* 0.7 to 1.8 manganese;
about 0.2 to 0.4 silicon;
[about 1.0] *greater than 2.0* to 9.0 nickel;
up to about 0.8 chromium;
about 0.4 to 1.5 molybdenum;
up to about 1.0 copper;
up to about 0.03 titanium; and
up to about 0.035 aluminum;
the balance iron and incidental impurities.

9. The welding electrode recited in claim 8 wherein said manganese ranges from [about] *greater than* 0.70 to 1.65 weight percent of said welding electrode weight.

10. The welding electrode recited in claim 8 wherein said nickel [ranges from about] *is greater than* 2.0 to 6.0 weight percent of said welding electrode weight.

17. A welding electrode useful for gas metal-arc welding of low carbon steels, said welding electrode consisting essentially of the following elemental composition, on a weight percent of said welding electrode weight basis:

about 0.01 to less than 0.05 carbon;
[about] *greater than* 0.7 to 1.65 manganese;
about 0.2 to 0.35 silicon;
[about] *greater than* 2.0 to 6.0 nickel;
up to about 0.4 chromium;
about 0.4 to 1.2 molybdenum;
up to about 0.8 copper;
up to about 0.03 titanium; and
up to about 0.035 aluminum;
the balance iron and incidental impurities.

19. A method for forming a weld deposit useful for joining pieces of low carbon steel, said method comprising welding said pieces of steel using a gas metal-arc welding technique with a welding electrode comprising *less than 0.05 weight percent* carbon [in an amount less than 0.05 weight percent of said welding electrode weight], *0 to less than 0.01 weight percent vanadium, and greater than 0.7 weight percent manganese, the welding electrode* [and] further comprising [nickel and] molybdenum *and greater than 2.0 weight percent nickel* in proportions effective to produce a weld deposit having a low carbon bainitic ferrite microstructure and a yield strength in excess of about 80 ksi.

20. The method recited in 19 wherein said welding electrode consists essentially of the following elemental composition, on a weight percent of said welding electrode weight basis:

about 0.01 to less than 0.05 carbon;
[about] *greater than* 0.7 to 1.8 manganese;
about 0.2 to 0.35 silicon;
[about 1.0] *greater than 2.0* to 9.0 nickel;
up to about 0.8 chromium;
about 0.4 to 1.5 molybdenum;
up to about 1.0 copper;
up to about 0.03 titanium;
*0 to less than 0.01 weight percent vanadium;* and
up to about 0.035 aluminum;
the balance iron and incidental impurities.

28. A method for forming a weld deposit useful for joining pieces of low carbon steel, said method comprising welding said pieces of steel using a gas metal-arc welding technique with a welding electrode consisting essentially of the following elemental composition, on a weight percent of said welding electrode weight basis:

about 0.01 to less than 0.05 carbon;
[about] *greater than* 0.7 to 1.8 manganese;
about 0.2 to 0.35 silicon;
[about 1.0] *greater than 2.0* to 9.0 nickel;
up to about 0.8 chromium;
about 0.4 to 1.5 molybdenum;
up to about 1.0 copper;
up to about 0.03 titanium; and
up to about 0.035 aluminum;
the balance iron and incidental impurities.

33. A welding electrode useful for gas metal-arc welding, said welding electrode consisting essentially of the following elemental composition, on a weight percent of said welding electrode basis, which is effective to produce a weld deposit having a low carbon bainitic ferrite microstructure:

less than 0.05 carbon;

[about 0.07] *greater than 0.7* to 1.8 manganese;

about 0.2 to 0.4 silicon;

[about 1.0] *greater than 2.0* to 9.0 nickel;

up to about 0.8 chromium;

about 0.4 to 1.5 molybdenum;

up to about 1.0 copper;

up to about 0.03 titanium; and the balance iron and incidental impurities.

34. The welding electrode recited in 33 consisting essentially of the following elemental composition:

about 0.01 to less than 0.05 carbon;

[about 0.07] *greater than 0.7* to 1.65 manganese;

about 0.2 to 0.35 silicon;

[about] *greater than* 2.0 to 6.0 nickel;

up to about 0.4 chromium;

about 0.4 to 1.2 molybdenum;

up to about 0.8 copper;

up to about 0.03 titanium; and the balance iron and incidental impurities.

35. A method for forming a weld deposit useful for joining pieces of low carbon steel, said method comprising welding said pieces of steel using a gas metal-arc welding technique with a welding electrode consisting essentially of the following elemental composition, on a weight percent of said welding electrode weight basis, which is effective to produce a weld deposit having a low carbon bainitic ferrite microstructure and a yield strength in excess of about 80 ksi:

less than 0.05 carbon;

[about 0.07] *greater than 0.7* to 1.8 manganese;

about 0.2 to 0.4 silicon;

[about 1.0] *greater than 2.0* to 9.0 nickel;

up to about 0.8 chromium;

about 0.4 to 1.5 molybdenum;

up to about 1.0 copper;

up to about 0.03 titanium; and the balance iron and incidental impurities.

36. The method recited in 35 wherein said welding electrode consists essentially of the following elemental composition, on a weight percent of said welding electrode weight basis:

about 0.01 to less than 0.05 carbon;

[about 0.07] *greater than 0.7* to 1.65 manganese;

about 0.2 to 0.35 silicon;

[about] 2.0 to 6.0 nickel;

up to about 0.4 chromium;

about 0.4 to 1.2 molybdenum;

up to about 0.8 copper;

up to about 0.03 titanium; and the balance iron and incidental impurities.

37. A welding electrode useful for gas metal-arc welding, said welding electrode comprising molybdenum, up to about 0.05 weight percent carbon [and], greater than 3.75 up to about 9.00 weight percent nickel, *and 0 to less than 0.01 weight percent vanadium,* said carbon, molybdenum and nickel in proportions effective to produce a weld deposit with a low carbon bainitic ferrite microstructure.

38. The welding electrode recited in 37 consisting essentially of the following elemental composition, on a weight percent of said welding electrode basis, which is effective to produce a weld deposit having a low carbon bainitic ferrite microstructure:

up to about 0.05 carbon;

[about 0.07] *greater than 0.7* to 1.8 manganese;

about 0.2 to 0.4 silicon;

greater than 3.75 up to about 9.0 nickel;

up to about 0.8 chromium;

about 0.4 to 1.5 molybdenum;

up to about 1.0 copper;

up to about 0.03 titanium; and the balance iron and incidental impurities.

\* \* \* \* \*